(12) United States Patent
Decker et al.

(10) Patent No.: US 11,224,903 B2
(45) Date of Patent: *Jan. 18, 2022

(54) VORTEX FLUSH BALL VALVE AND METHOD

(71) Applicant: Mogas Industries, Inc., Houston, TX (US)

(72) Inventors: Gifford Zach Decker, Spring, TX (US); Asmaa Sadek Kassab, Cypress, TX (US); Anthony Neal Hodge, Montgomery, TX (US); Robert D. Dibbern, Jr., Spring, TX (US)

(73) Assignee: Mogas Industries, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,984

(22) Filed: May 6, 2020

(65) Prior Publication Data
US 2020/0261947 A1 Aug. 20, 2020

Related U.S. Application Data

(62) Division of application No. 16/006,733, filed on Jun. 12, 2018.

(60) Provisional application No. 62/518,939, filed on Jun. 13, 2017.

(51) Int. Cl.
| | |
|---|---|
| *F16K 3/36* | (2006.01) |
| *B08B 9/032* | (2006.01) |
| *F16K 5/06* | (2006.01) |
| *B08B 9/00* | (2006.01) |
| *F16K 27/06* | (2006.01) |

(52) U.S. Cl.
CPC .............. *B08B 9/032* (2013.01); *B08B 9/00* (2013.01); *F16K 5/06* (2013.01); *F16K 27/067* (2013.01); *Y10T 137/0424* (2015.04); *Y10T 137/4259* (2015.04)

(58) Field of Classification Search
CPC ......... Y10T 137/0419; Y10T 137/0424; Y10T 137/4259; B08B 9/00
USPC ...................................... 251/315.01
See application file for complete search history.

(56) References Cited

U.S. PATENT DOCUMENTS

| | | | | |
|---|---|---|---|---|
| 4,292,989 A | * | 10/1981 | Cazzaniga ............ | F16K 5/0673 137/72 |
| 4,386,756 A | * | 6/1983 | Muchow ............... | F16K 5/0647 251/172 |
| 4,749,002 A | * | 6/1988 | Lembser ................... | F16K 5/20 137/246.22 |

(Continued)

*Primary Examiner* — Robert K Arundale
(74) *Attorney, Agent, or Firm* — Daniel N. Lundeen; Lundeen & Lundeen PLLC

(57) ABSTRACT

A ball valve has a purge fluid inlet passage into a cavity between a valve body and a flow control element, and has a purge fluid drain. The inlet passage is oriented at an angle relative to a normal line to the spherical ball surface at the location of the inlet passage, to promote vorticial flow of the purge fluid. A method introduces a purge fluid into a ball valve body cavity; removes the purge fluid from an outlet drain; and induces a vortex in a flow path of the purge fluid through the body cavity. The method can flush debris from the body cavity between operating cycles of the ball valve by at least temporarily opening the inlet and outlet before and/or after operation of the valve.

21 Claims, 10 Drawing Sheets
(1 of 10 Drawing Sheet(s) Filed in Color)

(56) References Cited

U.S. PATENT DOCUMENTS

| | | | |
|---|---|---|---|
| 9,314,824 B2* | 4/2016 | Gu .................... | F16K 27/0218 |
| 2003/0066982 A1* | 4/2003 | Gardner ............... | F16K 27/067 |
| | | | 251/315.1 |
| 2009/0095931 A1* | 4/2009 | Stunkard .............. | F16K 27/067 |
| | | | 251/174 |
| 2010/0193722 A1* | 8/2010 | Jervis .................. | F16K 5/0689 |
| | | | 251/315.1 |

* cited by examiner

VORTEX FLUSH BALL VALVE AND METHOD

CROSS REFERENCE TO RELATED APPLICATIONS

This application is a divisional of application U.S. Ser. No. 16/006,733, filed Jun. 12, 2018, which claims priority to and the benefit of provisional application U.S. 62/518,939, filed Jun. 13, 2017.

BACKGROUND

In various processes, ball valves may be employed to control or isolate the flow of fluids containing or forming solids or other foreign materials, collectively referred to as "debris." During operation of the ball valve, the process fluid may communicate with the cavity between the valve body and the flow control element, where the entrained material may deposit and promote corrosion and/or interfere with the seals or operation of the valve. As shown in FIG. 1, it is common to employ a body purge 1 where a relatively clean purge fluid is introduced from outside the valve 2 into the cavity around the flow control element 3. The purge fluid may maintain a positive pressure in the body cavity when the valve is not being operated, i.e., in the fully open or fully closed positions, to inhibit process fluid and debris entry. However, such valve purges are not always effective to prevent entry of the entrained materials into the cavity when the valve is operated between the fully open and fully closed positions and the process fluid communicates with the cavity, especially where the process fluid flow rate is much greater than the purge fluid flow rate, as is the usual case. There is thus a need to improve the prevention of debris entry and/or removal of debris from the cavity of a ball valve.

SUMMARY

The present disclosure is generally directed to a ball valve and method incorporating a vortical flushing functionality or step to facilitate debris removal from the valve cavity.

In one class of embodiments, a ball valve with a vortical flush functionality comprises: a flow control element rotatably disposed in a valve body and defining a cavity between an outer spherical surface of the flow control element and an inner surface of the valve body; at least a first purge fluid inlet passage through the valve body to the cavity having a flow axis directed at or near (tangential to) the outer spherical surface at a first location; a purge fluid drain from the cavity through the valve body; and an orientation of the flow axis of the first purge fluid inlet passage transverse to a line normal to the spherical surface at the first location.

Preferably, the ball valve comprises a second purge fluid inlet passage through the valve body to the cavity having a flow axis directed at or near (tangential to) the outer spherical surface at a second location and having an orientation of the flow axis of the second purge fluid inlet passage transverse to a normal line to the spherical surface at the second location. If desired, the ball valve may also have one or more additional purge fluid inlet passages through the valve body to the cavity having a flow axis directed at or near (tangential to) the outer spherical surface at a respective additional location and having an orientation of the flow axis of the respective additional purge fluid inlet passage transverse to a normal line to the spherical surface at the respective additional location.

In another class of embodiments, a method for purging the cavity in a ball valve, e.g., any embodiment of the ball valve described herein, comprises: introducing a purge fluid into the first purge fluid inlet passage, into the second purge fluid inlet passage (wherein the second purge flow inlet passage is present), or both; and removing the purge fluid from the cavity through the purge fluid drain to create a vortical flow path through the cavity from the first purge fluid inlet passage to the purge fluid drain, from the second purge fluid inlet passage (wherein the second purge flow inlet passage is present) to the purge fluid drain, or both.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
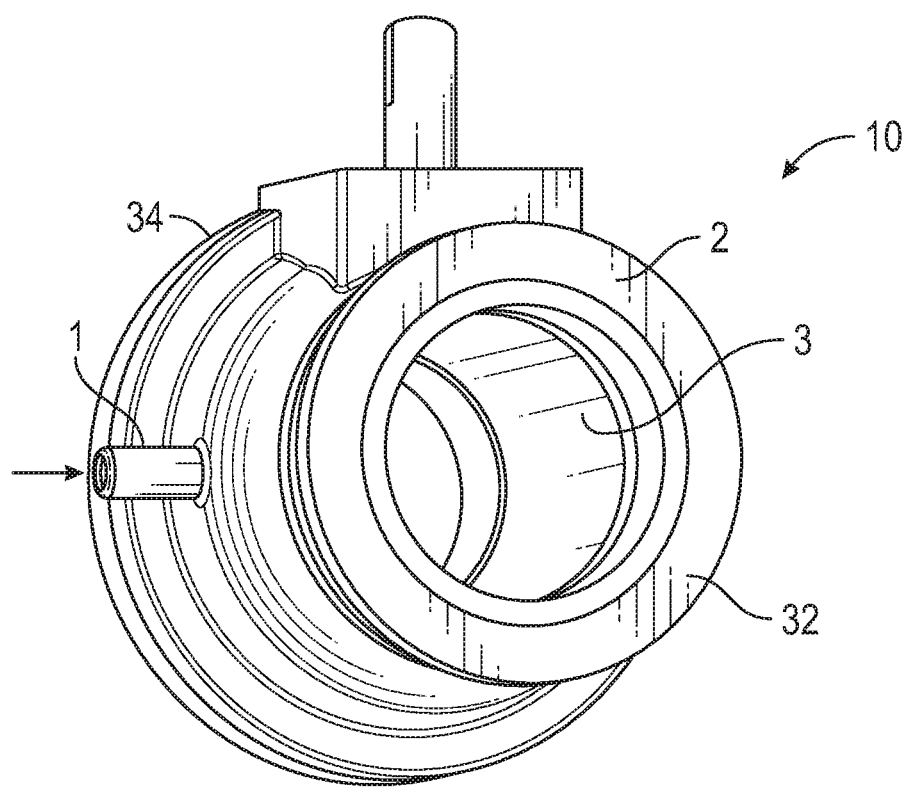
FIG. 1 is a perspective view of a prior art body purge on a ball valve.

Initially it is noted that, in the development of any actual embodiments, numerous implementation-specific decisions must be made to achieve the developer's specific goals, such as compliance with system-related and business-related constraints, which will vary from one implementation to another. The compositions and processes disclosed herein can also comprise components or steps other than those cited or specifically referred to. While detailed embodiments are disclosed herein, it is understood that the disclosed embodiments are merely exemplary of the disclosure, which may be embodied in various forms. Specific structural and functional details disclosed herein are not intended to be limiting, but merely illustrations that can be modified within the scope of the attached claims.

The following definitions are provided to aid those skilled in the art in understanding the detailed description.

As used in the specification and claims, "near" is inclusive of "at." The term "and/or" refers to both the inclusive "and" case and the exclusive "or" case, whereas the term "and or" refers to the inclusive "and" case only and such terms are used herein for brevity. For example, a component comprising "A and/or B" may comprise A alone, B alone, or both A and B; and a component comprising "A and or B" may comprise A alone, or both A and B.

As used herein, a ball valve includes a flow control element that has at least part of the outer surface that is spherical, and is rotatably disposed within a valve body between inlet and/or outlet valve seats. The flow control element is operable between open and closed positions by rotation of the flow control element about a central axis of rotation of the flow control element. Some embodiments may have a flow control element with a flow passage or bore disposed transversely with respect to the axis of rotation, and at least a portion of the outer surface flow of the flow control element is spherical to sealingly engage corresponding concave surfaces of the valve seat(s).

The "cavity" of a ball valve refers to the space between the valve body and the flow control element, e.g., the spherical shell or three-dimensional annular space defined by an outer surface of the flow control element and an inner surface of the valve body.

A "fluid" may be liquid, gas, or a combination thereof such as a foam or aerosol. A "process fluid" is a fluid that is or is intended to be passed through the flow passage of the flow control element or isolated by the flow control element. A "purge fluid" is a fluid supplied to a ball valve other than as a process fluid, and may be used or intended to be used for purposes other than purging, e.g., flushing, pressurization, etc. "Debris" refers to solids, gums, and other heterogeneous foreign materials, not necessarily undesirable, e.g., in a process fluid.

"Directing" a fluid flow refers to controlling the direction of the fluid, e.g., channeling in an enclosed conduit or imparting directional momentum to a fluid as it enters or passes through a bulk volume essentially unbounded in two or more dimensions, e.g., between opposing or parallel surfaces and/or into a tank or container. A "flow axis" refers to a line at the geometric center of a stream of fluid that is parallel to the direction of flow. For example, the "process fluid flow axis" refers to the axis of the central bore or passage through the flow control element.

Figure 2:
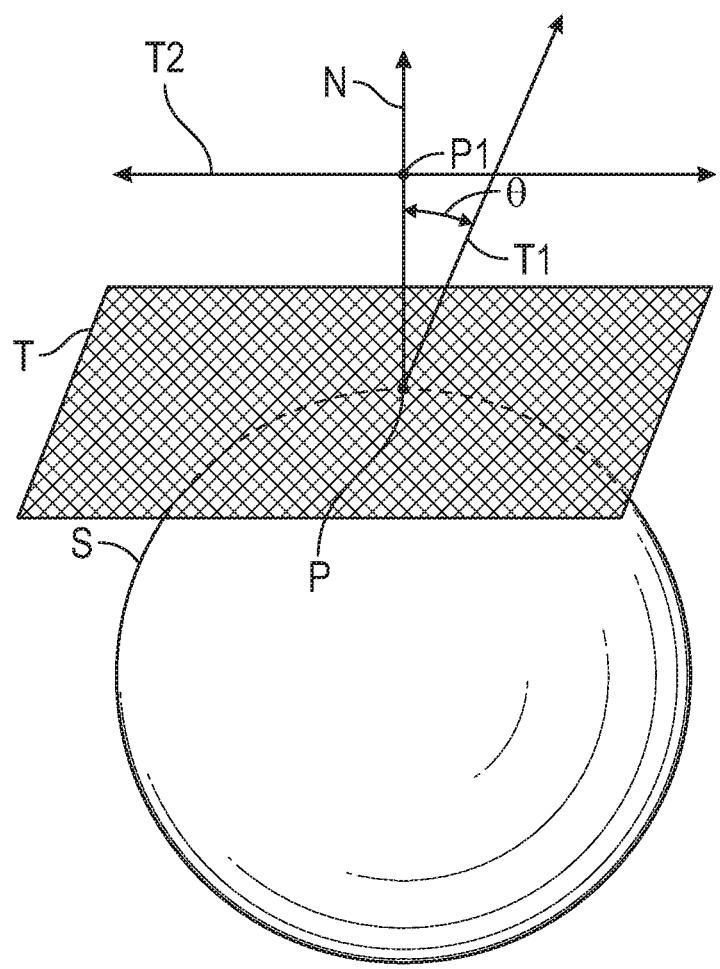
FIG. 2 shows the geometric relationships of a normal line, tangent plane, and flow axes in the context of the present invention.
Figure 3:
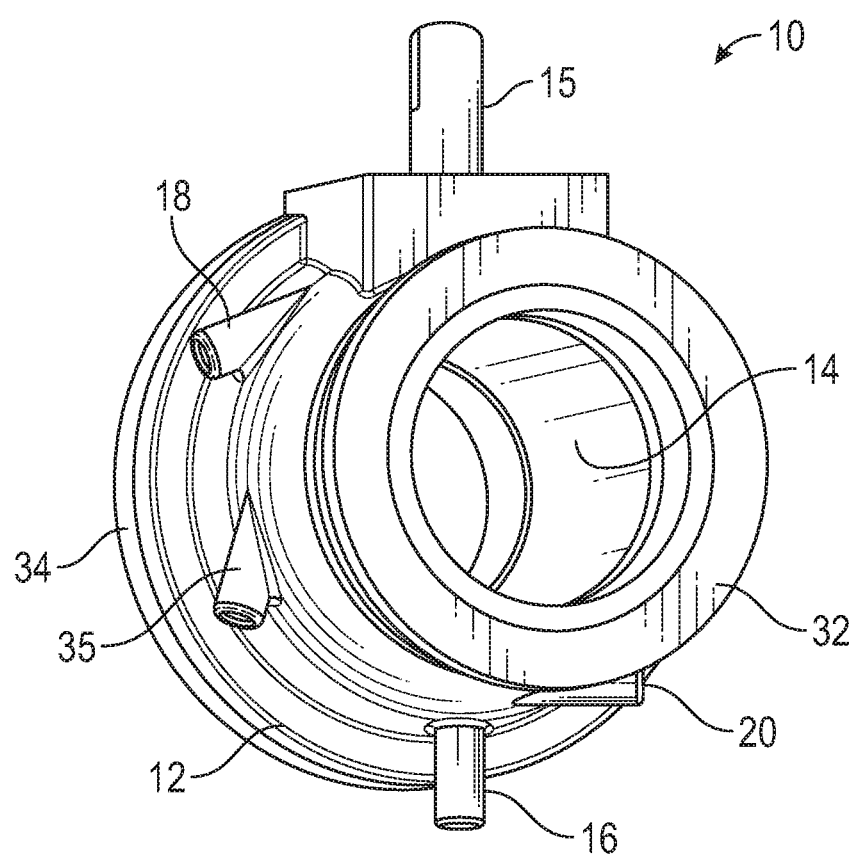
FIG. 3 is a perspective view of a ball valve with purge fluid inlets and a drain according to the present invention.
Figure 4:
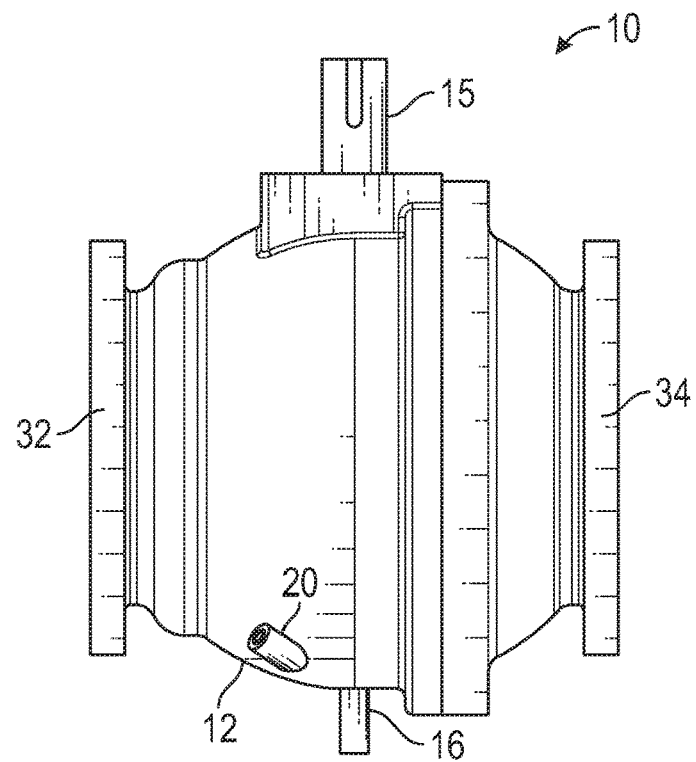
FIG. 4 is a side view of the ball valve of FIG. 3.
Figure 5:
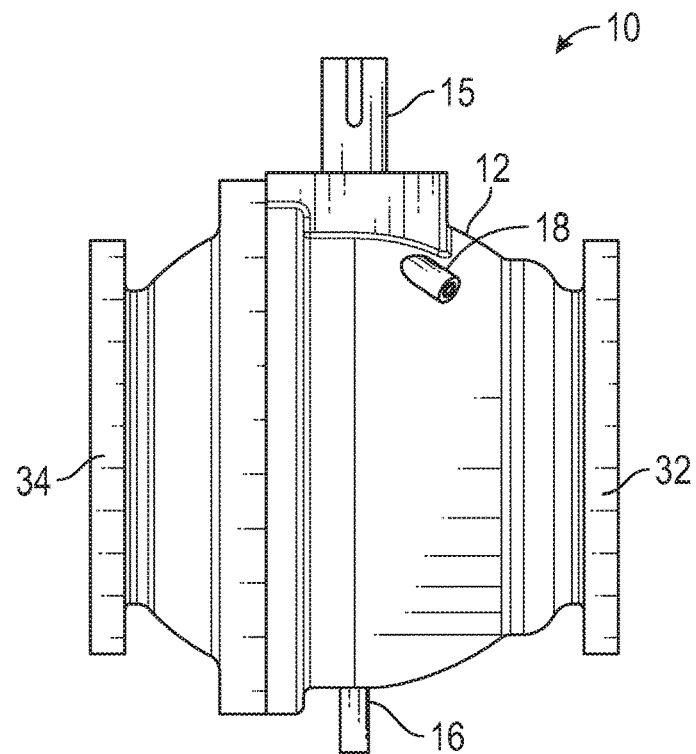
FIG. 5 is an opposite side view of the ball valve of FIGS. 3 and 4.
Figure 6:
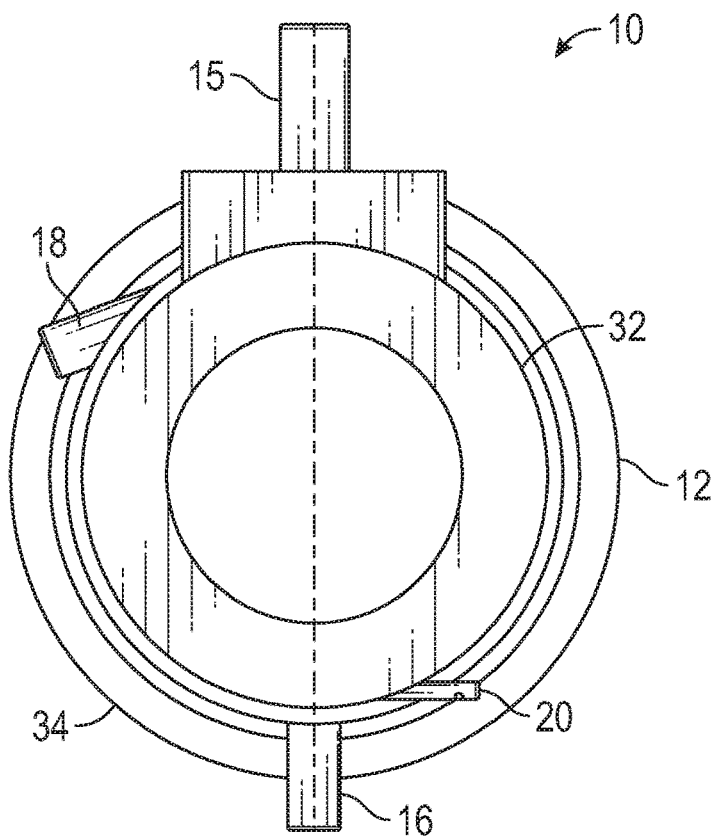
FIG. 6 is an end view of the ball valve of FIGS. 3-5.
Figure 7:
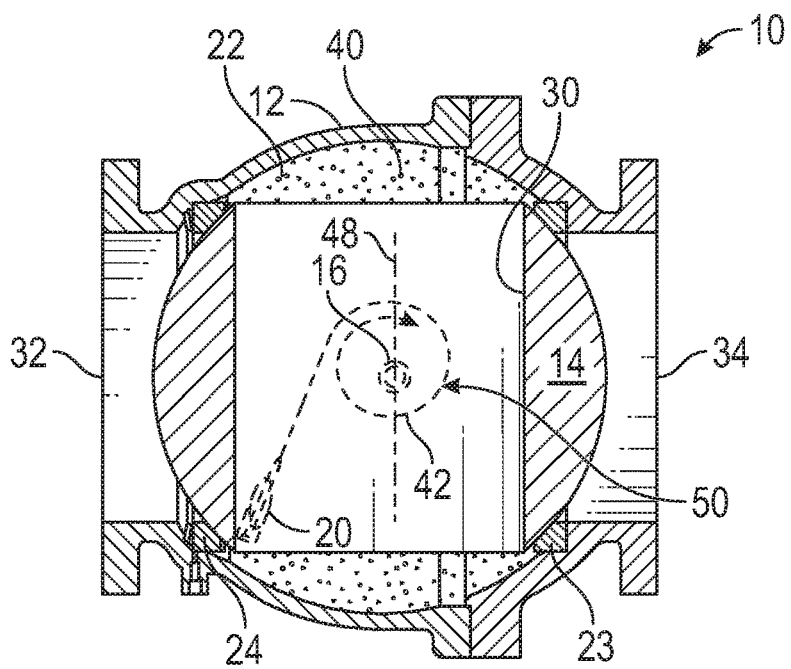
FIG. 7 is a top sectional view of the ball valve of FIGS. 3-6.

The terms "normal line" and "tangent" to a point on a spherical surface are used in their mathematical sense, i.e., the normal line N is normal to the surface of the sphere S at point P and orthogonal to the tangent plane T, as shown in FIG. 2. However, for the purposes of the specification and claims, a purge flow axis T1 and/or its projection that does not touch the spherical surface, is also considered as tangent to the point P on the sphere that is closest to the flow axis or a projection of the flow axis (at P1) as it passes the sphere S. The angle between the tangent purge flow axis T1 and the normal line N is defined as 90 degrees. The angle between the normal line N and the purge flow axis T2 is shown as θ in FIG. 2. As used herein unless otherwise indicated, "normal" and "tangent" are with respect the spherical surface of the flow control element.

"Upstream" refers to the normal or intended process fluid flow inlet or high pressure side of the valve, usually the side where the spring or other biasing element is positioned to bias the flow control element, and "downstream" refers to the normal process fluid flow outlet or low pressure side, usually on the side opposite the biasing element.

As used herein, "upper" and "lower" and similar terms are used in reference to a ball valve taking the valve stem as the "upper" end when the axis of rotation is vertical, even though the valve may be installed and/or operated with the stem extending downward or horizontal or otherwise transverse to vertical. The term "lower" means that the item referred to is closer to the lowermost end than the uppermost, while "upper" means closer to the uppermost than the lowermost.

As used herein, "inner" refers to a point or location toward or closer to the center of an object than a reference, whereas "outer" refers to a point or location away from or farther away from the center than the reference.

A "vortex" refers to a mass of spinning fluid that tends to draw things toward a central relatively low-pressure region, and "vortex flow" refers to the generally spiral and/or helical path traced by fluid traveling through the vortex toward the low-pressure region. "Vortical" refers to a whirling fluid as if in a vortex.

The term "drain" refers to a mechanical component such as an opening or conduit used for removing fluid from a place or container; and "draining" to removing the fluid from the place or container.

In one class of embodiments, a ball valve can have a vortical flushing functionality. The valve has a flow control element rotatably disposed in a valve body. A cavity is defined as the spherical shell or three-dimensional annulus between an outer spherical surface of the flow control element and an inner surface of the valve body. The valve has at least a first purge fluid inlet passage through the valve body to the cavity. This passage has a flow axis directed at or near to the outer spherical surface at or near (tangential to, as defined herein) a first location. A purge fluid drain through the valve body is in communication with the cavity. The flow axis of the first purge fluid inlet passage is oriented transversely to a line normal to the spherical surface at the first location.

Preferably, the ball valve comprises a second purge fluid inlet passage through the valve body to the cavity. The second purge fluid inlet passage has a flow axis directed at or near (tangential to, as defined herein) the outer spherical surface of the flow control element at a second location. The second flow axis is oriented transversely to a normal line to the spherical surface at the second location. If desired, the ball valve may also have one or more additional purge fluid inlet passages through the valve body to the cavity, each having a flow axis at or near (tangential to, as defined herein) the outer spherical surface at a respective additional location and having an orientation of the flow axis of the respective additional purge fluid inlet passage transverse to a normal line to the spherical surface at the respective additional location.

In any embodiment herein, the purge fluid drain is preferably located below the flow control element at an axis of rotation of the flow control element. The ball valve may have a vortical purge fluid flow path from the first location to the outlet drain, from the second location (wherein the second purge flow inlet passage is present) to the outlet drain, or both. In any embodiment, the flow axis of the first purge fluid inlet passage may be at an angle from 30 to 90 degrees, preferably 45 to 90 degrees, more preferably from 60 to 90 degrees, with respect to the normal line at the first location, and if the second and or additional purge flow inlet passages are present, the flow axes of the second and or additional purge fluid inlet passages may likewise be at an angle with respect to the normal line at the respective second and or additional location of from 30 to 90 degrees, preferably from 45 to 90 degrees, more preferably from 60 to 90 degrees. Preferably, the angles of the flow axes of the first and second purge flow inlet passages with respect to the respective normal lines are oriented in the same azimuthal direction to reinforce vorticial purge fluid flow paths from the inlet passages to the purge fluid drain.

In any embodiment, the flow axis of the first purge fluid inlet passage may be tangential to the outer spherical surface at the first location, the flow axis of the second purge fluid inlet passage (wherein the second purge flow inlet passage is present) may be tangential to the outer spherical surface at the second location, or both.

In any embodiment, the flow axis of the first purge fluid inlet passage may be oblique with respect to the normal line at the first location, the flow axis of the second purge fluid inlet passage (wherein the second purge flow inlet passage is present) may be oblique with respect to the normal line at the second location, or both.

Preferably, the first location is disposed on a hemisphere of the flow control element opposite the purge fluid drain. Preferably, the second location (wherein the second purge flow inlet passage is present) is disposed on the same hemisphere as the purge fluid drain.

In another class of embodiments, a method is provided for purging the cavity in a ball valve, e.g., any embodiment of the ball valve described herein. The method comprises the introduction of a purge fluid into the first purge fluid inlet passage, into the second purge fluid inlet passage (wherein the second purge flow inlet passage is present), or both; and removing the purge fluid from the cavity through the purge fluid drain. This creates a vorticial flow path through the cavity from the first purge fluid inlet passage to the purge fluid drain, from the second or other purge fluid inlet passages (wherein the second and/or additional purge flow inlet passages are present) to the purge fluid drain, or a combination thereof.

The method preferably comprises introducing the purge fluid through the first purge fluid inlet passage at an angle from 30 to 90 degrees, preferably 45 to 90 degrees, more preferably from 60 to 90 degrees, with respect to the normal line at the first location, and if the second purge flow inlet passage is present, introducing the purge fluid through the second purge fluid inlet passage at an angle with respect to the normal line the second location of from 30 to 90 degrees, preferably from 45 to 90 degrees, more preferably from 60 to 90 degrees.

Preferably, the cavity comprises debris and the method further comprises flushing the debris from the cavity.

In any embodiment, the method may further comprise: operating the flow control element to provide communication between the cavity and a process fluid, preferably comprising debris, in a process flow passage through the flow control element; operating the flow control element to terminate the communication between the process fluid and the cavity; opening the purge fluid drain for the creation of the vorticial flow path(s); and flushing the debris from the cavity. The method may further comprise closing the purge fluid drain. Preferably, the method comprises: a cycle comprising the operation of flow control element to provide and terminate the communication between the cavity and the process fluid, the subsequent flushing of the debris from the cavity through the purge fluid drain while the communication between the cavity and the process fluid is terminated, and then closing the purge fluid drain; and repeating the cycle a plurality of times.

In any embodiment, the purge fluid drain may be closed before the provision of the fluid communication and opened after the termination of the fluid communication. If desired, the purge fluid may instead be introduced into the cavity during the operation of the flow control element and the provision of the fluid communication.

The method may further comprise closing the purge fluid drain and introducing the purge fluid into the cavity between operating cycles to provide a positive pressure in the cavity greater than a pressure of the process fluid in the process flow passage.

With reference to the embodiments shown in FIGS. 3-10, ball valve 10 comprises a ball valve body 12 surrounding a flow control element or "ball" 14 having a generally spherical surface which can be rotated between open and closed positions by means of stem 15. The valve 10 includes a purge fluid drain passage 16 ("drain") and one or more purge fluid inlet passages, e.g., an inlet passage 18 through a coupling welded or otherwise connected to the valve body 12 at an angle transverse to normal near the stem 15 ("stem inlet") and/or an inlet passage 20 through a similar coupling near the drain 16 ("body inlet"). If desired, the inlets 18, 20 may be connected to a purge fluid supply with respective valves (not shown) and/or manifold (not shown) to supply the purge fluid. Similarly, the drain 16 may be provided with a valve (not shown) to open or close the drain 16 for fluid removal or isolation.

The stem inlet 18 is spaced from the stem 15 and is preferably oriented tangentially toward the stem 15 to promote a radial flow of purge fluid in the valve cavity 22 around the ball 14 in one direction, clockwise or counterclockwise with respect to the process fluid flow axis, on one or preferably both sides of the stem 15. The body inlet 20 is spaced from the drain 16 and is preferably oriented tangentially to one side, upstream or downstream, of the drain 16, so as to form a vortex around the drain 16. The body inlet 20 may also be oriented in the same clockwise or counterclockwise direction as the stem inlet 18, and thus reinforce the general radial flow direction of purge fluid through the valve cavity 22 (see FIG. 8). If desired, one or more additional purge fluid inlet passages 35 may be provided through the valve body to the cavity having a flow axis directed toward or tangential to the outer spherical surface at a respective additional location and having an orientation of the flow axis of the respective additional purge fluid inlet passage transverse to a normal line to the spherical surface at the respective additional location.

Figure 8:
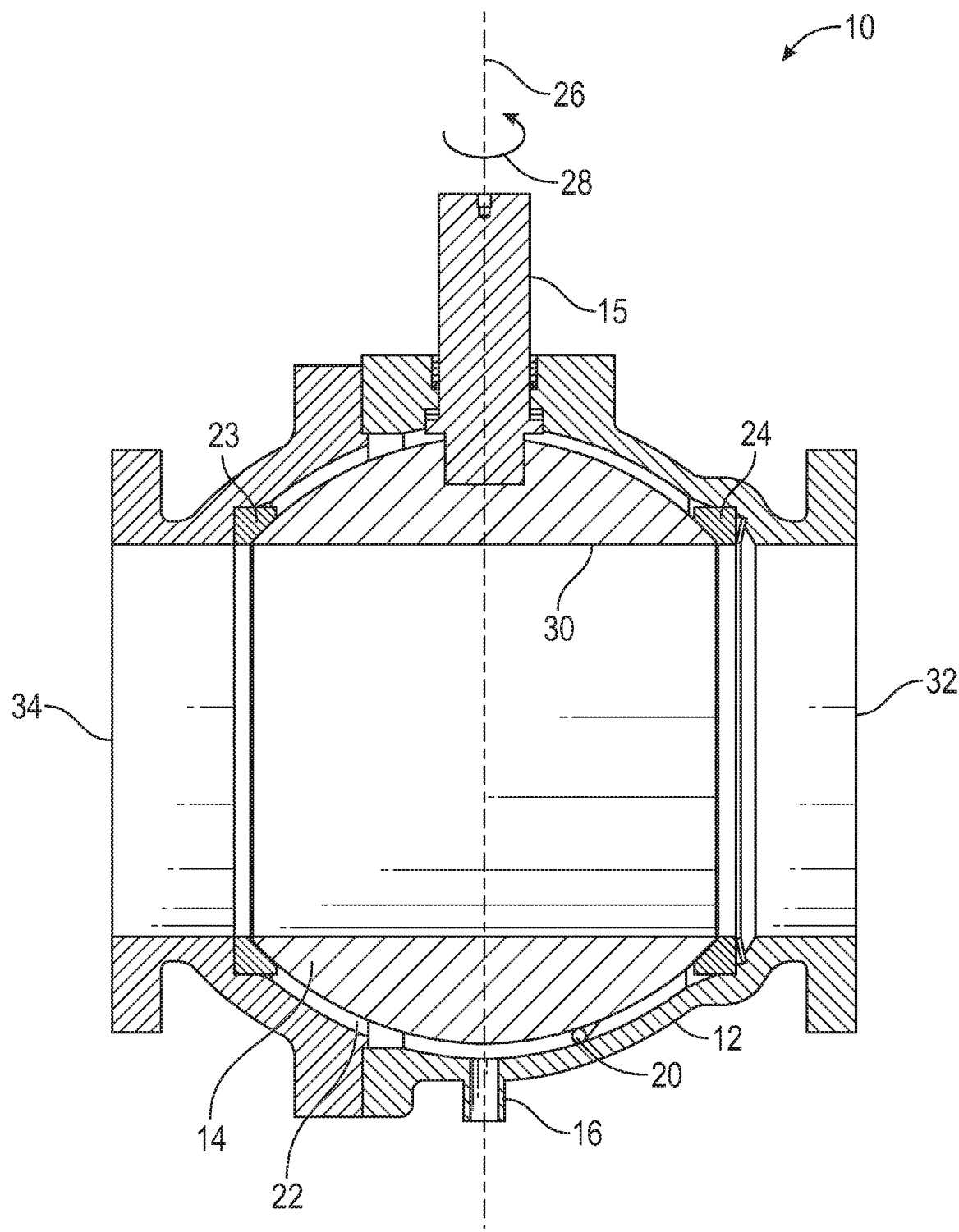
FIG. 8 is a side sectional view of the ball valve of FIGS. 3-7 in an open position.
Figure 9:
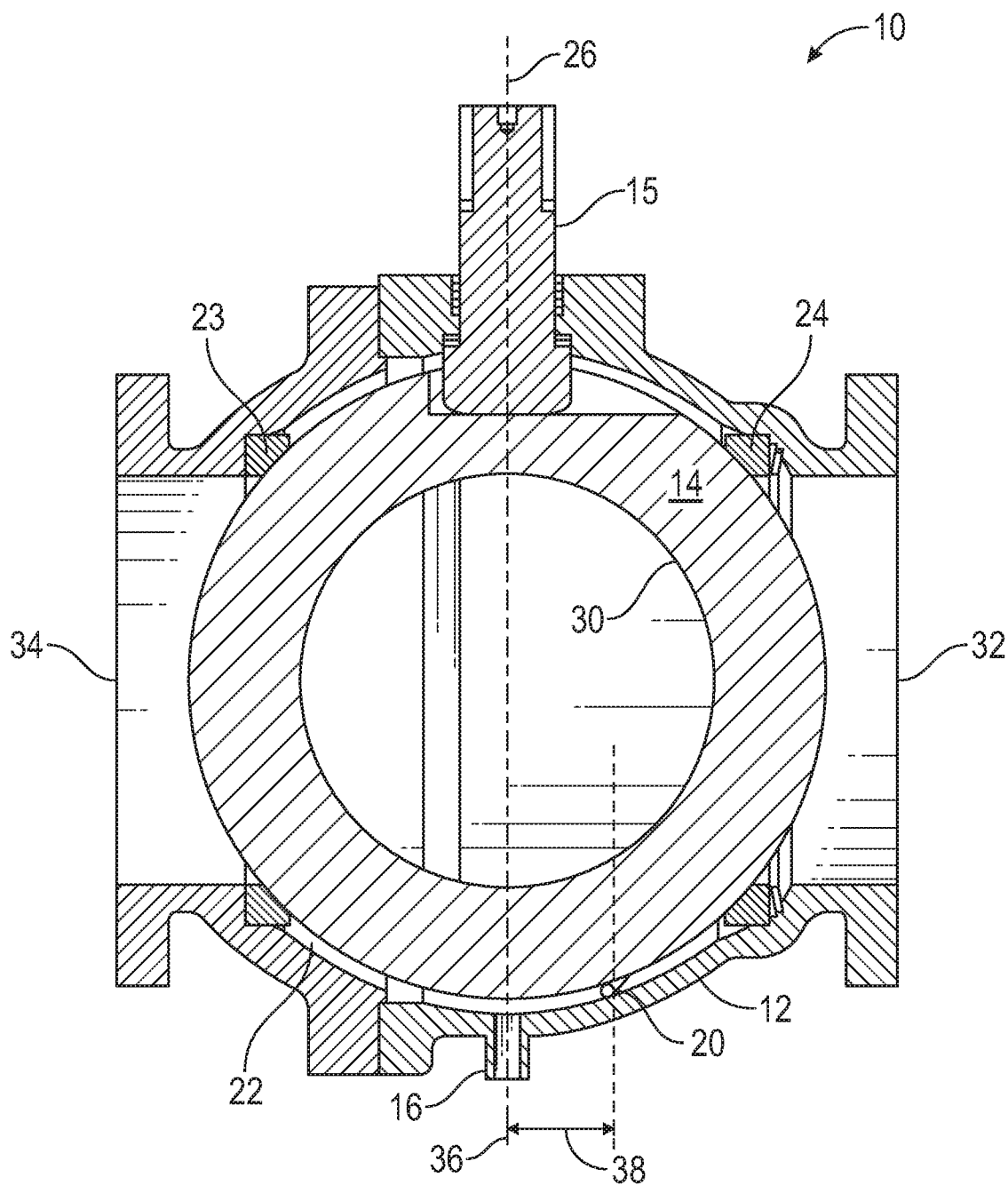
FIG. 9 is a side sectional view of the ball valve of FIGS. 3-7 in a closed position.

As best seen in FIGS. 7-10, the ball 14 is disposed within the valve body 12 between a pair of valve seats 23, 24, dimensioned and arranged within the valve body 12 to produce sealing contact, e.g., metal-to-metal contact, against the flow control element 14 such that the flow control element 14 is independently rotatable via the stem 15 about a central axis 26 as indicated by the arrow 28 in FIG. 8. In an open position as shown in FIG. 8, the process fluid flow passage 30 is aligned with process fluid ports 32, 34, whereas in a closed position as shown in FIG. 9 the ball 14 has been rotated 90° and flow passage 30 is transverse to isolate the ports 32, 34.

Figure 10:
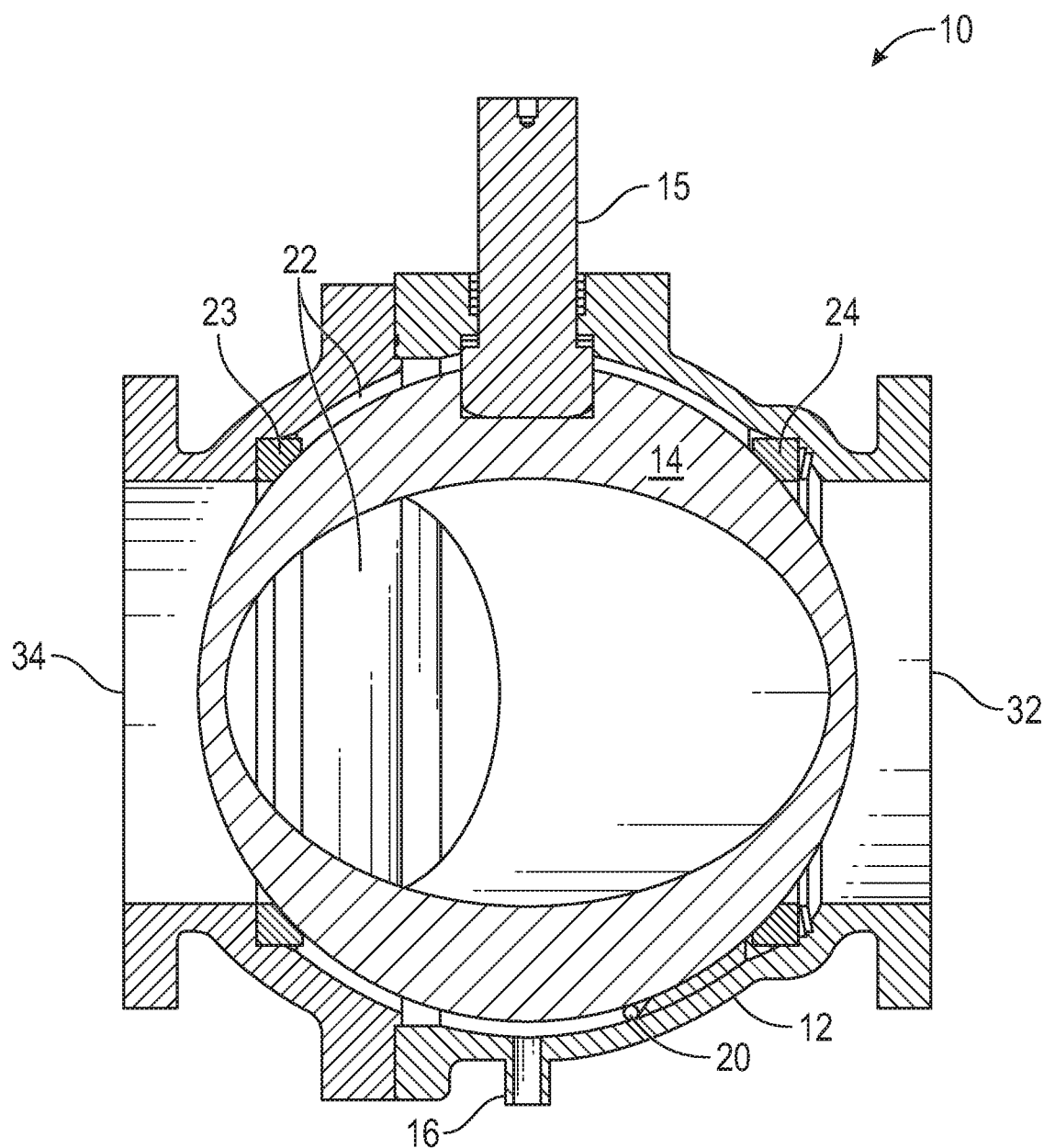
FIG. 10 is a side sectional view of the ball valve of FIGS. 3-7 in a partially open position.

FIG. 10 shows the ball 14 in a partially open position during operation of the valve 10 between the open and closed positions. During operation of the valve 10, rotation of the ball 14 places the flow passage 30 temporarily in fluid communication with the cavity 22 and drain 16. Generally, the flow rate of any purge fluid that might be supplied to inlets 18, 20 is overwhelmed by the volume of process fluid, and may not prevent the process fluid from entering the cavity 22 during valve operation. Debris 40 present in the process fluid can thus enter the cavity 22.

As shown in FIG. 9, in embodiments, the body inlet 20 is spaced away from the flow axis 36 of the outlet drain 16 by projected distance 38. In any embodiment, the axis 36 is shown as collinear with the rotation axis 26 of the flow control element 14. In embodiments, the projected distance 38 is equal to about 5% to about 45% of the diameter 54 (10-90% of the radius) of the flow control element 14. The body inlet 20 is configured, e.g., directionally oriented, relative to the outlet drain to induce a vorticial flow pattern 42 (see FIG. 7) around the drain 16, facilitating the flushing of any trapped debris 40 (see FIGS. 7 and 10) from the body cavity 22. The tangential or near tangential entry of stem purge inlet 18 located on the opposite hemisphere of the ball 14, similarly swirls through the cavity 22 to sweep debris 40 into the vorticial flow 42 near the drain 16. By controlling the spacing and orientation of the purge flow inlets 18, 20, this debris 40 is effectively removed from the internal cavity 22 of the ball valve. This improved removal of the debris 40 allows for proper operation of the valve for longer periods of time and/or a reduced frequency of removing the valve from service for debris removal or maintenance.

In a class of embodiments, a method for purging the cavity 22 in the ball valve 10 comprises introducing a purge fluid through the purge fluid inlets 18 and/or 22, and removing the purge fluid from the cavity 22 through the drain 16 to create a vorticial flow path 42 and flush debris 40 from the cavity 22. In any embodiment, the purge fluid may be a liquid, e.g., water, an oil, a solvent, another process fluid, and/or the like, a gas, e.g., air, nitrogen, carbon dioxide, oxygen, and/or the like, a condensable fluid, e.g., steam, or any combination thereof. The purge fluid is directed into the purge fluid inlets 18, 20 at a volume and a pressure sufficient to induce vorticial flow as the purge fluid flows from the purge fluid inlets 18, 20 to the drain 16.

The flushing is preferably conducted immediately or shortly following operation of the valve 10 so that the process fluid and debris can be removed from the cavity 22. In this manner, any tendency of the trapped process fluid to thicken, gel, solidify, or form debris, e.g., in a coker or heavy crude oil effluent stream, is avoided. If desired, between operation of the valve 10, the purge fluid may be used to pressurize the cavity 22, e.g., with the drain 16 closed, or to continuously or periodically flush the cavity 22 by opening the drain. The following operating exemplary sequence of steps is enabled:

1) Initially, the valve 10 is in the open or closed position, the drain is closed, and process fluid is supplied at pressure to the inlet port 32;
2) The valve 10 is then operated by rotation between the opened and closed positions;
3) If desired, the purge fluid inlets 18, 20 can be or remain closed for step 3 or opened (or left open) to receive purge fluid to exit into the process fluid during step 3;
4) After operation of the valve in step 3, when the valve is in the fully open or closed position, the drain 16 is opened and the inlets 18, 20 are opened for a period of time to flush the cavity 22 and remove any debris and/or process fluid;
5) Then the drain 16 is closed, e.g., until following the next operation cycle of the valve 10; and
6) If desired, purge fluid may be supplied to the inlets 18, 20 between operating cycles to maintain a pressure in the cavity 22 that is higher than that of the process fluid to inhibit process fluid entry.

Embodiments

Accordingly, the invention provides the following embodiments:

1. A ball valve with a vorticial flush functionality comprising:
   a flow control element rotatably disposed in a valve body and defining a cavity between an outer spherical surface of the flow control element and an inner surface of the valve body;
   a first purge fluid inlet passage through the valve body to the cavity having a flow axis directed toward or tangential to the outer spherical surface at a first location;
   a purge fluid drain from the cavity through the valve body; and
   optionally an orientation of the flow axis of the first purge fluid inlet passage transverse to a normal line to the spherical surface at the first location.

2. The ball valve of paragraph 1, wherein the purge fluid drain is located below the flow control element at an axis of rotation of the flow control element.

3. The ball valve of paragraph 1 or paragraph 2, optionally comprising a second purge fluid inlet passage through the valve body to the cavity having a flow axis directed toward or tangential to the outer spherical surface at a second location and having an orientation of the flow axis of the second purge fluid inlet passage transverse to a normal line to the spherical surface at the second location.

4. The ball valve of any of paragraphs 1 to 3, comprising a vorticial purge fluid flow path from the first location to the outlet drain, from the second location (wherein the second purge flow inlet passage is present) to the outlet drain, or both.

5. The ball valve of any of paragraphs 1 to 4, wherein the flow axis of the first purge fluid inlet passage is at an angle from 30 to 90 degrees, preferably 45 to 90 degrees, more preferably from 60 to 90 degrees, with respect to the normal line at the first location, and if the second purge flow inlet passage is present, the flow axis of the second purge fluid inlet passage is at an angle with respect to the normal line at the second location of from 30 to 90 degrees, preferably from 45 to 90 degrees, more preferably from 60 to 90 degrees; preferably wherein the angles of the flow axes of the first and second purge flow inlet passages with respect to the respective normal lines are oriented in the same azimuthal direction to reinforce vorticial purge fluid flow paths from the inlet passages to the purge fluid drain.

6. The ball valve of any of paragraphs 1 to 5, wherein the flow axis of the first purge fluid inlet passage is tangential to the outer spherical surface at the first location, the flow axis of the second purge fluid inlet passage (wherein the second purge flow inlet passage is present) is tangential to the outer spherical surface at the second location, or both.

7. The ball valve of any of paragraphs 1 to 6, wherein the flow axis of the first purge fluid inlet passage is oblique with respect to the normal line at the first location, the flow axis of the second purge fluid inlet passage (wherein the second purge flow inlet passage is present) is oblique with respect to the normal line at the second location, or both.

8. The ball valve of any of paragraphs 1 to 7, wherein the first location is disposed on a hemisphere of the flow control element opposite the purge fluid drain.

9. The ball valve of any of paragraphs 1 to 8 wherein the second location (wherein the second purge flow inlet passage is present) is disposed on the same hemisphere as the purge fluid drain.
10. The ball valve of any of paragraphs 1 to 9, comprising the second purge fluid inlet passage and one or more additional purge fluid inlet passages through the valve body to the cavity having a flow axis directed toward or tangential to the outer spherical surface at a respective additional location and having an orientation of the flow axis of the respective additional purge fluid inlet passage transverse to a normal line to the spherical surface at the respective additional location.
11. A method for purging the cavity in a ball valve, preferably the ball valve according to any of paragraphs 1 to 10, comprising:
    introducing a purge fluid into the first purge fluid inlet passage, into the second purge fluid inlet passage (wherein the second purge flow inlet passage is present), or both; and
    removing the purge fluid from the cavity through the purge fluid drain to create a vortical flow path through the cavity from the first purge fluid inlet passage to the purge fluid drain, from the second purge fluid inlet passage (wherein the second purge flow inlet passage is present) to the purge fluid drain, or both.
12. The method of paragraph 11, comprising introducing the purge fluid through the first purge fluid inlet passage at an angle from 30 to 90 degrees, preferably 45 to 90 degrees, more preferably from 60 to 90 degrees, with respect to the normal line at the first location, and if the second purge flow inlet passage is present, introducing the purge fluid through the second purge fluid inlet passage at an angle with respect to the normal line the second location of from 30 to 90 degrees, preferably from 45 to 90 degrees, more preferably from 60 to 90 degrees.
13. The method of paragraph 11 or paragraph 12, wherein the cavity comprises debris and wherein the method further comprises flushing the debris from the cavity.
14. The method of any of paragraphs 11 to 13, further comprising:
    operating the flow control element to provide communication between the cavity and a process fluid, preferably comprising debris, in a process flow passage through the flow control element;
    operating the flow control element to terminate the communication between the process fluid and the cavity;
    opening the purge fluid drain for the creation of the vortical flow path(s); and
    flushing the debris from the cavity.
15. The method of paragraph 14, further comprising closing the purge fluid drain.
16. The method of paragraph 15, further comprising:
    a cycle comprising the operation of flow control element to provide and terminate the communication between the cavity and the process fluid, the subsequent flushing of the debris from the cavity through the purge fluid drain while the communication between the cavity and the process fluid is terminated, and then closing the purge fluid drain; and
    repeating the cycle a plurality of times.
17. The method of any of paragraphs 11 to 16, wherein the purge fluid drain is closed before the provision of the fluid communication and opened after the termination of the fluid communication.
18. The method of any of paragraphs 11 to 16, wherein the purge fluid is introduced into the cavity during the operation of the flow control element and the provision of the fluid communication.
19. The method of any of paragraphs 11 to 18, further comprising:
    closing the purge fluid drain; and
    introducing the purge fluid into the cavity between operating cycles to provide a positive pressure in the cavity greater than a pressure of the process fluid in the process flow passage.

Experimental

Figure 11:
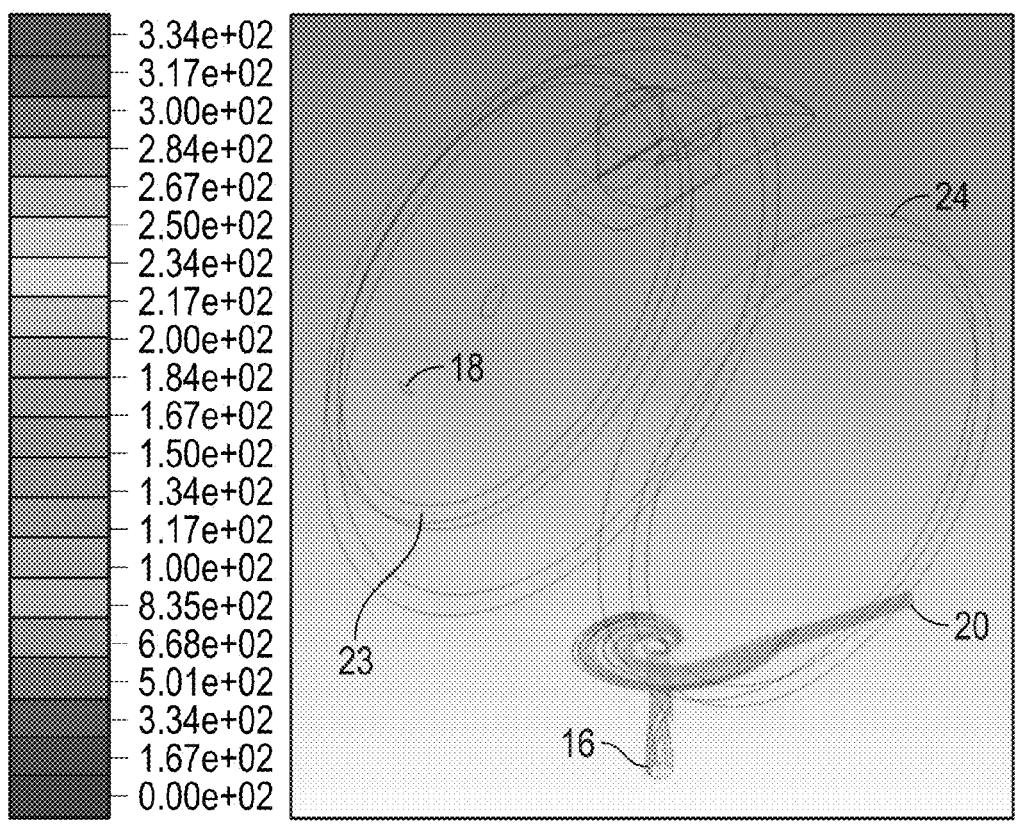
FIG. 11 is a plot of a 3-dimensional diagram of the modeled, isolated purge fluid flow pathlines from the body purge to the drain.
Figure 12:
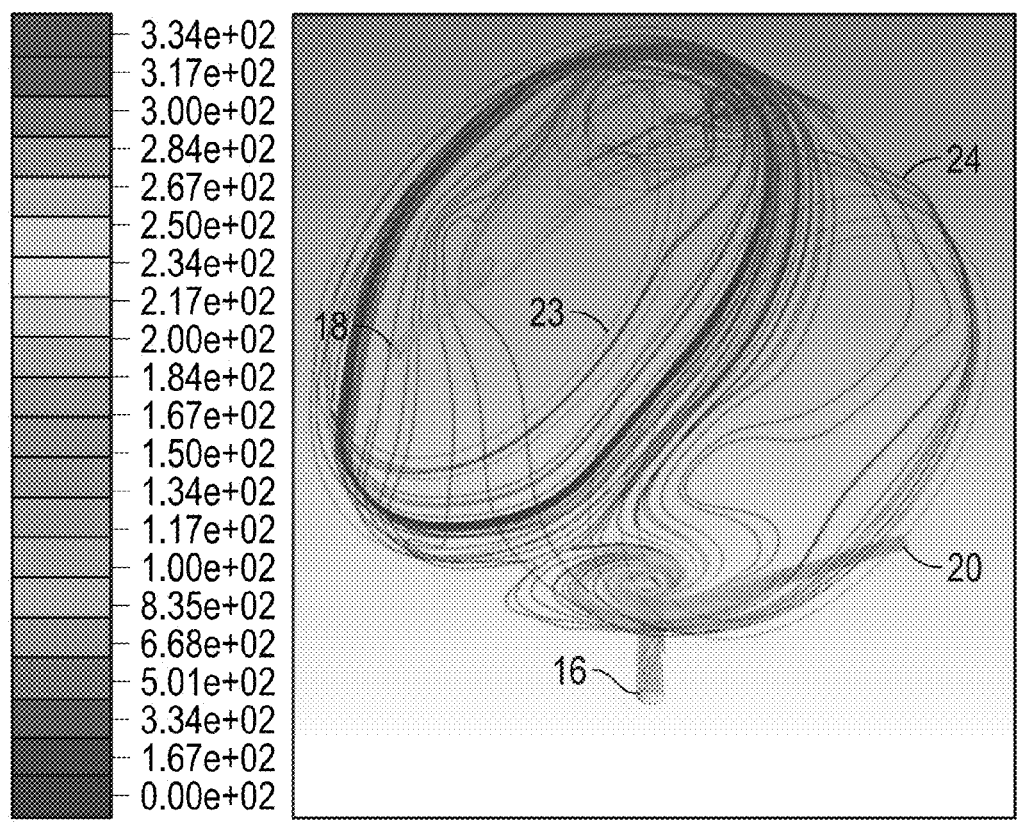
FIG. 12 is a plot of a 3-dimensional diagram of the modeled purge fluid flow pathlines from the combined body purge inlet and stem purge inlet to the drain.

A 24-in. valve substantially as shown in FIGS. 3-10 was mathematically modeled for flow pathlines and velocities using ANSYS Fluent Release 16.0 (3d, dp, pbns, rke, transient) software. The vortical pathlines for operation of the body purge 20 to the drain 16 from this simulation for water as the purge fluid are shown in FIG. 11. The vortical pathlines for operation of the inlet purge 18 and the body purge 20 to the drain 16 are shown in FIG. 12.

Figure 13:
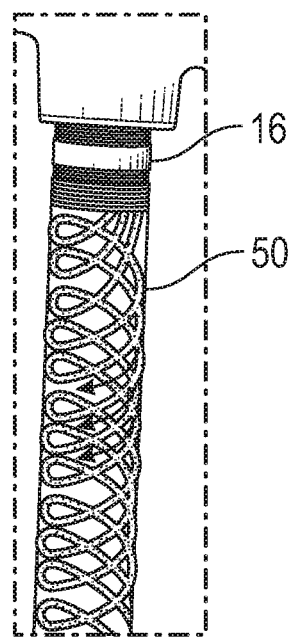
FIG. 13 shows the vortical flow pattern through a transparent pipe from a drain from a ball valve according to the present invention.
Figure 14:
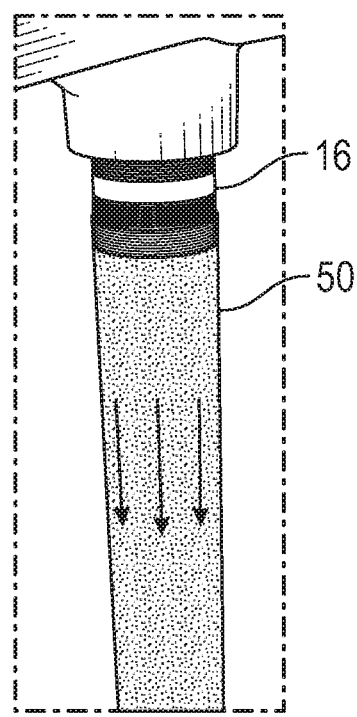
FIG. 14 shows the comparatively straight flow pattern through a transparent pipe from an inventive drain from a ball valve using the purge inlet shown in FIG. 1.

A 24-in. valve substantially as shown in FIGS. 1 and 3-10 was modified for testing with both the conventional purge 1 and with the inlets 18, 20 and drain 16. A water supply manifold with valves was connected to the inlets 1, 18, 20, and the drain 16 was provided with a transparent pipe 50 to observe fluid flow at the exit. When the water was supplied to both inlets 18, 20, with the valve 10 in the open position a distinct swirling flow was evident as shown in FIG. 13. In contrast, when the water was supplied only through the inlet 1, the flow pattern was straight and no swirling was seen, as seen in FIG. 14.

Next, dry wall mud was mixed with water at 3:1, and added to the cavity with the drain closed and the valve 10 in the open position. After allowing the mud to settle in the cavity for a few hours, water was supplied to the inlet ports 18, 20 for 40 s and 114.8 kg (253 lbs) were collected from the drain 16. Repeating the test with the body purge inlet 1, only 94.3 kg (208 lb) were collected. This test demonstrated use of the inlets 18, 20 and drain 16 according to the present invention 21.6% more of the mud was recovered.

The priority document is incorporated by reference. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:
1. A method for purging a cavity in a ball valve, comprising:
    providing a ball valve comprising:
        a flow control element rotatably disposed in a valve body and defining a cavity between an outer spherical surface of the flow control element and an inner surface of the valve body;
        a first purge fluid inlet passage through the valve body to the cavity having a flow axis directed toward or tangential to the outer spherical surface at a first location and having an orientation of the flow axis of the first purge fluid inlet passage transverse to a normal line to the spherical surface at the first location; and a purge fluid drain from the cavity through the valve body located below the flow control element at an axis of rotation of the flow control element;

introducing a purge fluid into the first purge fluid inlet passage; and simultaneously removing the purge fluid from the cavity through the purge fluid drain to create a vorticial flow path through the cavity from the first purge fluid inlet passage to the purge fluid drain;

closing the purge fluid drain;

with the purge fluid drain closed, operating the flow control element to provide communication between the cavity and a process fluid ion a process flow passage through the flow control element;

with the purge fluid drain closed, operating the flow control element to terminate the communication between the process fluid and the cavity, then opening the purge fluid drain for the creation of the vorticial flow path(s) to flush process fluid and debris from the cavity, closing the purge fluid drain, and introducing the purge fluid into the cavity between operating cycles to provide a positive pressure in the cavity greater than a pressure of the process fluid in the process flow passage.

2. The method of claim 1, further comprising a second purge fluid inlet passage through the valve body to the cavity having a flow axis directed toward or tangential to the outer spherical surface at a second location and having an orientation of the flow axis of the second purge fluid inlet passage transverse to a normal line to the spherical surface at the second location, wherein the purge fluid introduced through the first purge fluid inlet passage is at an angle from 30 to 90 degrees, with respect to the normal line at the first location, wherein a purge fluid introduced through the second purge fluid inlet passage is at an angle with respect to the normal line the second location of from 30 to 90 degrees, or both.

3. The method of claim 1, wherein the cavity comprises debris and wherein the method further comprises flushing the debris from the cavity.

4. The method of claim 1, further comprising:

a cycle comprising the operation of flow control element to provide and terminate the communication between the cavity and the process fluid, the subsequent flushing of debris from the cavity through the purge fluid drain while the communication between the cavity and the process fluid is terminated, and then closing the purge fluid drain; and repeating the cycle a plurality of times.

5. The method of claim 1, wherein the purge fluid drain is closed before the provision of the fluid communication and opened after the termination of the fluid communication.

6. The method of claim 1, wherein the purge fluid is introduced into the cavity during the operation of the flow control element and the provision of the fluid communication.

7. The method of claim 1, wherein the flow axis of the first purge fluid inlet passage is tangential to the outer spherical surface at the first location, the flow axis of the second purge fluid inlet passage is tangential to the outer spherical surface at the second location, or both.

8. The method of claim 1, wherein the flow axis of the first purge fluid inlet passage is oblique with respect to the normal line at the first location, the flow axis of the second purge fluid inlet passage is oblique with respect to the normal line at the second location, or both.

9. The method of claim 1, wherein the first location is disposed on a hemisphere of the flow control element opposite the purge fluid drain.

10. The method of claim 9, wherein the second location is disposed on the same hemisphere as the purge fluid drain.

11. The method of claim 1, wherein the ball valve comprises one or more additional purge fluid inlet passages through the valve body to the cavity having a flow axis directed toward or tangential to the outer spherical surface at a respective additional location and having an orientation of the flow axis of the respective additional purge fluid inlet passage transverse to a normal line to the spherical surface at the respective additional location.

12. The method of claim 2, wherein the angles of the flow axes of the first and second purge flow inlet passages with respect to the respective normal lines are oriented in the same azimuthal direction to reinforce vorticial purge fluid flow paths from the inlet passages to the purge fluid drain.

13. A method for purging a cavity in a ball valve, comprising:

providing a ball valve comprising:

a flow control element rotatably disposed in a valve body and defining a cavity between an outer spherical surface of the flow control element and an inner surface of the valve body;

a purge fluid inlet passage through the valve body to the cavity having a flow axis directed toward or tangential to the outer spherical surface at a location and having an orientation of the flow axis of the purge fluid inlet passage transverse to a normal line to the spherical surface at the location, wherein the purge fluid inlet passage flow axis is at an angle from 30 to 90 degrees with respect to the normal line; and a purge fluid drain from the cavity through the valve body located below the flow control element at an axis of rotation of the flow control element;

introducing a purge fluid into the purge fluid inlet passage;

with the purge fluid drain closed, operating the flow control element to provide communication and then terminate the communication between the cavity and a process fluid in a process flow passage through the flow control element;

then opening the purge fluid drain to create a vorticial flow path through the cavity from the purge fluid inlet passage to the purge fluid drain;

flushing debris from the cavity;

closing the purge fluid drain, and introducing the purge fluid into the cavity between operating cycles to provide a positive pressure in the cavity greater than a pressure of the process fluid in the process flow passage.

14. The method of claim 13, further comprising:

a cycle comprising the operation of flow control element to provide and terminate the communication between the cavity and the process fluid, the subsequent flushing of the debris from the cavity through the purge fluid drain while the communication between the cavity and the process fluid is terminated, and then closing the purge fluid drain; and repeating the cycle a plurality of times.

15. The method of claim 14, wherein the purge fluid drain is closed before the provision of the fluid communication and opened after the termination of the fluid communication.

16. The method of claim 13, wherein the purge fluid is introduced into the cavity during the operation of the flow control element and the provision of the fluid communication.

17. A method for purging a cavity in a ball valve, comprising the steps of:
(a) providing a ball valve comprising:
a flow control element rotatably disposed in a valve body and defining a cavity between an outer spherical surface of the flow control element and an inner surface of the valve body;
a purge fluid inlet passage through the valve body to the cavity having a flow axis directed toward or tangential to the outer spherical surface at a location and having an orientation of the flow axis of the purge fluid inlet passage transverse to a normal line to the spherical surface at the location, wherein the purge fluid inlet passage flow axis is at an angle from 30 to 90 degrees with respect to the normal line; and
a purge fluid drain from the cavity through the valve body located below the flow control element at an axis of rotation of the flow control element;
(b) supplying a purge fluid to the purge fluid inlet passage to provide a positive pressure in the cavity greater than a pressure of a process fluid in a process flow passage through the flow control element;
(c) with the purge fluid drain in a closed position while supplying the purge fluid to the purge fluid inlet passage, operating the flow control element to provide communication between the cavity and the process fluid;
(d) operating the flow control element to terminate the communication between the process fluid and the cavity;
(e) while supplying the purge fluid to the purge fluid inlet passage, opening the purge fluid drain to create a vorticial flow path through the cavity from the purge fluid inlet passage to the purge fluid drain and flush debris from the cavity;
(f) closing the purge fluid drain;
(g) supplying the purge fluid to the purge fluid inlet passage to provide the positive pressure in the cavity greater than the pressure of the process fluid in the process flow passage through the flow control element;
(h) cyclically repeating steps (c) to (g) a plurality of times.

18. A method for purging a cavity in a ball valve, comprising:
providing a ball valve comprising:
a flow control element rotatably disposed in a valve body and defining a cavity between an outer spherical surface of the flow control element and an inner surface of the valve body;
a first purge fluid inlet passage through the valve body to the cavity having a flow axis directed toward or tangential to the outer spherical surface at a first location and having an orientation of the flow axis of the first purge fluid inlet passage transverse to a normal line to the spherical surface at the first location;
a second purge fluid inlet passage through the valve body to the cavity having a flow axis directed toward or tangential to the outer spherical surface at a second location and having an orientation of the flow axis of the second purge fluid inlet passage transverse to a normal line to the spherical surface at the second location; and
a purge fluid drain from the cavity through the valve body located below the flow control element at an axis of rotation of the flow control element;
introducing a purge fluid into the first purge fluid inlet passage, into the second purge fluid inlet passage, or both; and
simultaneously removing the purge fluid from the cavity through the purge fluid drain to create a vorticial flow path through the cavity from the first purge fluid inlet passage to the purge fluid drain, from the second purge fluid inlet passage to the purge fluid drain, or both;
wherein the angles of the flow axes of the first and second purge flow inlet passages with respect to the respective normal lines are oriented in the same azimuthal direction to reinforce vorticial purge fluid flow paths from the inlet passages to the purge fluid drain.

19. A method for purging a cavity in a ball valve, comprising:
providing a ball valve comprising:
a flow control element rotatably disposed in a valve body and defining a cavity between an outer spherical surface of the flow control element and an inner surface of the valve body;
a first purge fluid inlet passage through the valve body to the cavity having a flow axis directed toward or tangential to the outer spherical surface at a first location and having an orientation of the flow axis of the first purge fluid inlet passage transverse to a normal line to the spherical surface at the first location;
a second purge fluid inlet passage through the valve body to the cavity having a flow axis directed toward or tangential to the outer spherical surface at a second location and having an orientation of the flow axis of the second purge fluid inlet passage transverse to a normal line to the spherical surface at the second location; and
a purge fluid drain from the cavity through the valve body located below the flow control element at an axis of rotation of the flow control element;
introducing a purge fluid into the purge fluid inlet passage; and
simultaneously removing the purge fluid from the cavity through the purge fluid drain;
wherein the first location is disposed on a hemisphere of the flow control element opposite the purge fluid drain and the second location is disposed on the same hemisphere as the purge fluid drain.

20. The method of claim 19, wherein the second purge fluid inlet passage is spaced away from the purge fluid drain and oriented tangentially to one side of the purge fluid drain to form a vortex around the purge fluid drain and create a vorticial flow path through the cavity from the second purge fluid inlet passage to the purge fluid drain.

21. The method of claim 20, wherein the second purge fluid inlet passage is spaced away from the purge fluid drain and oriented tangentially to one side of the purge fluid drain by a projected distance equal to about 5% to about 45% of a diameter of the flow control element.

* * * * *